United States Patent
Schweikert et al.

(10) Patent No.: US 6,587,331 B1
(45) Date of Patent: Jul. 1, 2003

(54) ALUMINUM ELECTROLYTE CAPACITOR WITH REDUCED INDUCTIVITY

(75) Inventors: Wilhelm Schweikert, Heidenhelm (DE); Norbert Will, Heidenhelm (DE)

(73) Assignee: EPCOS Aktiengesellschaft, München (DE)

( * ) Notice: Subject to any disclaimer, the term of this patent is extended or adjusted under 35 U.S.C. 154(b) by 0 days.

(21) Appl. No.: 09/831,325

(22) PCT Filed: Nov. 15, 1999

(86) PCT No.: PCT/DE99/03624

§ 371 (c)(1),
(2), (4) Date: Jul. 12, 2001

(87) PCT Pub. No.: WO00/30134

PCT Pub. Date: May 25, 2000

(30) Foreign Application Priority Data

Nov. 18, 1998 (DE) .......................................... 198 53 267

(51) Int. Cl.$^7$ ................................................. H01G 9/08
(52) U.S. Cl. ....................... 361/519; 361/503
(58) Field of Search ........................ 361/503, 508–512, 361/513, 516, 517, 518, 519, 520, 521, 535–538

(56) References Cited

U.S. PATENT DOCUMENTS

| | | | |
|---|---|---|---|
| 1,513,348 A | | 10/1924 | Schultz |
| 3,648,337 A | | 3/1972 | Greskamp et al. |
| 3,753,051 A | | 8/1973 | Willy |
| 5,579,203 A | * | 11/1996 | Klaschka .................... 29/25.41 |
| 5,798,906 A | * | 8/1998 | Ando et al. .................. 361/517 |
| 6,201,686 B1 | * | 3/2001 | Hiratsuka et al. ............ 361/502 |

FOREIGN PATENT DOCUMENTS

| | | | |
|---|---|---|---|
| DE | 504 408 | 7/1930 | |
| DE | 38 30 094 | 6/1989 | |
| DE | 297 18 066 | 3/1998 | |
| EP | 0 517 936 | 12/1992 | |
| EP | 0 598 256 | 10/1993 | |
| GB | 1 689 638 | 10/1977 | |
| JP | 5-144681 | * 6/1993 | ......... H01G/009/04 |

* cited by examiner

*Primary Examiner*—Anthony Dinkins
*Assistant Examiner*—Eric W Thomas
(74) *Attorney, Agent, or Firm*—Schiff Hardin & Waite

(57) ABSTRACT

An aluminum electrolyte capacitor with reduced inductivity is installed in a metal housing that is closed by a cover disk provided with metallic lead-throughs. Electrically conductive bodies are arranged at the cover disk at a region of high magnetic fields when current flows.

12 Claims, 1 Drawing Sheet

ALUMINUM ELECTROLYTE CAPACITOR WITH REDUCED INDUCTIVITY

BACKGROUND OF THE INVENTION

The invention is directed to an aluminum electrolyte capacitor with reduced inductivity that is installed in a metal housing that is closed by a cover disk provided with metallic lead-throughs.

At high operating frequencies, aluminum electrolyte capacitors have a high impedance due to an inductive portion, the impedance being capable of deteriorating the electrical function of the capacitor in the circuit.

In order to reduce the inductive portion in the electrolyte capacitor, the electrical connections between the capacitor winding and the electrical lead-throughs in special electrolyte capacitors are designed such that the spatial distance between the two lines is minimal. The magnetic field that arises when a current flows is thus likewise minimal. Due to the high fabrication-oriented expense and the high costs connected therewith that arise from this solution, this technical approach is not very common in large round can electrolyte capacitors.

SUMMARY OF THE INVENTION

An object of the present invention is to specify an aluminum electrolyte capacitor with reduced inductivity that can be manufactured without high fabrication-oriented expense and in a beneficial manner.

According to the present invention, electrically conductive bodies are arranged at the cover disk, preferably in the region of high magnetic fields given a current flow.

The advantage is thereby achieved that currents (eddy currents) are produced in the conductive bodies by counter-induction, the currents weakening the alternating magnetic field. As a result thereof, the inductivity of the electrolyte capacitor is reduced.

The invention is explained in greater detail on the basis of the following exemplary embodiments.

DESCRIPTION OF THE PREFERRED EMBODIMENTS

Figure 1:
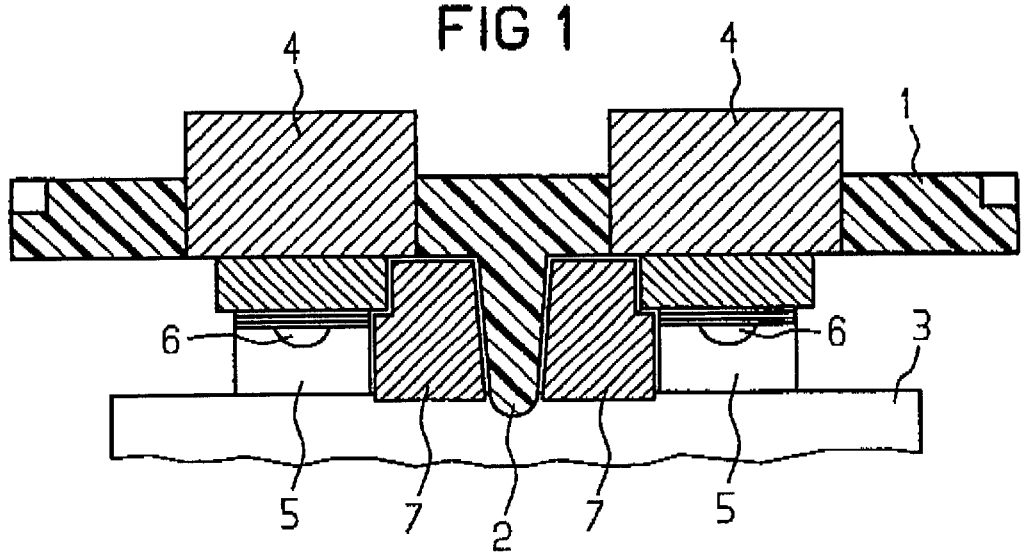
FIG. 1 illustrates a capacitor cover with conductive bodies on the inside.

For the purposes of promoting an understanding of the principles of the invention, reference will now be made to two preferred embodiments illustrated in the drawings and specific language will be used to describe the same. It will nevertheless be understood that no limitation of the scope of the invention is thereby intended, such alterations and further modifications in the illustrated devices and methods, and such further applications of the principles of the invention as illustrated therein being contemplated as would normally occur to one skilled in the art to which the invention relates.

FIG. 1 shows a cover 1 that, with a terminating disk, closes a capacitor housing (not shown in FIG. 1). The cover 1 preferably comprises an insulating plastic and has, for example, a joining piece 2 that is introduced onto a core hole of the capacitor winding 3 and thus centers the winding 3.

Lead-throughs 4 are arranged in the cover 1, the terminal ribbons 5 of the capacitor winding 3 being secured thereto at the inside with rivets 6.

The magnetic fields within the electrolyte capacitor between the cover disk 1 and the capacitor winding 3 are at a maximum between the terminal ribbons 5. This cavity is therefore filled with conductive bodies 7. So that the quality of the electrolyte capacitor is not deteriorated, these bodies 7 comprise pure aluminum. However, it is also possible that the bodies 7 comprise a conductive plastic that is neutral with respect to the electrolyte. It is also possible to design the bodies 7 as hollow members.

So that the standard cover disks 1 need not be modified, only the two cavities next to the joining piece 2 that separate the plus and minus region of the electrolyte capacitor from one another are initially filled with conductive bodies 7 in the embodiment of FIG. 1. However, it is also possible that conductive bodies are also arranged at the other side of the lead-throughs 4.

Another exemplary embodiment of a cover disk 1 provides that the cavities between the lead-throughs 4 at the outside are filled. This occurs with a metal disk a surface of which has an electrical insulation, so that no tracking currents can arise between the lead-throughs 4. The disk is shaped such that the region between the lead-throughs 4 is nearly completely filled.

Figure 2:
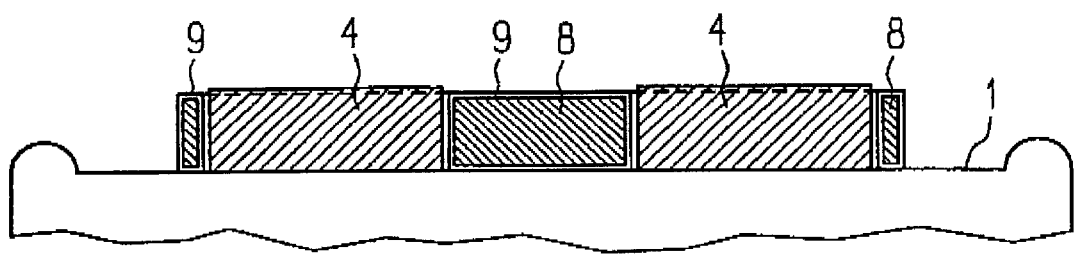
FIG. 2 shows a capacitor cover with conductive bodies on the outside.

Another improvement according to the further exemplary embodiment of FIG. 2 is achieved by the complete embrace of the lead-throughs 4 above the cover disk 1 since eddy currents that are generated by the outside wiring are thus also enabled, so that a lowering of the overall inductivity results therefrom. Here, too, the metal disk 8 has an electrical insulation on its surface 9.

The following inductivities were measured at 4 MHz at an aluminum electrolyte capacitor having a diameter of 75 mm and a height of 145 mm: 14.0 nH without disk between the terminals and without conductive bodies in the electrolyte capacitor and 11.3 nH with conductive bodies in the electrolyte capacitor. 12.5 nH with a disk between the terminals and without conductive bodies in the electrolyte capacitor and 9.5 nH with conductive bodies in the electrolyte capacitor.

By employing at least one conductive body in addition to the commercially available terminating disk 1, thus the inductivity can be lowered by one-third. The inductivity can be lowered further (<50%) by enlarging the conductive parts, this being possible by integration of these metal parts into the disk (as inlay parts when injecting the disk).

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An aluminum electrolyte capacitor with reduced inductivity, comprising:

a capacitor winding installed in a metal housing that is closed by a cover disk;

metallic lead-throughs passing through the cover disc; and at least one electrically conductive body electrically isolated with respect to the lead-throughs and arranged at at least one of above and below a planar lateral surface of the cover disk in a region of magnetic fields when current flows.

2. The aluminum electrolyte capacitor according to claim 1 wherein the at least one electrically conductive body is arranged between the lead throughs.

3. The aluminum electrolyte capacitor according to claim 1 wherein the at least one electrically conductive body comprises aluminum.

4. The aluminum electrolyte capacitor according to claim 1 wherein the at least one electrically conductive body comprises a conductive plastic that is neutral with respect to an operating electrolyte of the capacitor.

5. The aluminum electrolyte capacitor according to claim 1 wherein the at least one electrically conductive body is designed as a hollow body.

6. The aluminum electrolyte capacitor according to claim 1 wherein the at least one electrically conductive body is arranged on an inside of the cover disk between the lead-throughs.

7. The aluminum electrolyte capacitor according to claim 1 wherein the at least one electrically conductive body is arranged between the lead-throughs on an outside of the cover disk.

8. The aluminum electrolyte capacitor according to claim 7 wherein the at least one electrically conductive body comprises a disk embracing the lead-throughs.

9. The aluminum electrolyte capacitor according to claim 1 wherein two of said electrically conductive bodies are provided arranged at an inside of the cover disk between the lead-throughs.

10. The aluminum electrolyte capacitor according to claim 9 wherein the two electrically conductive bodies are spaced apart and centered by an adjoining piece attached as part of the cover disk.

11. The aluminum electrolyte capacitor according to claim 1 wherein the at least one electrically conductive body comprises a metal disk at a top surface of said cover disk, said metal disk having respective apertures for receiving respective first and second of said lead-throughs.

12. An aluminum electrolyte capacitor with reduced inductivity, comprising:

a capacitor winding installed in a metal housing that is closed by a cover disk;

metallic lead-throughs passing through the cover disk;

terminal ribbons connecting the respective metallic lead-throughs to the capacitor winding; and at least one electrically conductive body at an inside lateral surface of the cover disk in a region of magnetic fields when current flows.

\* \* \* \* \*